July 10, 1923.
L. F. STAFFORD
BUMPER
Original Filed Nov. 21, 1921
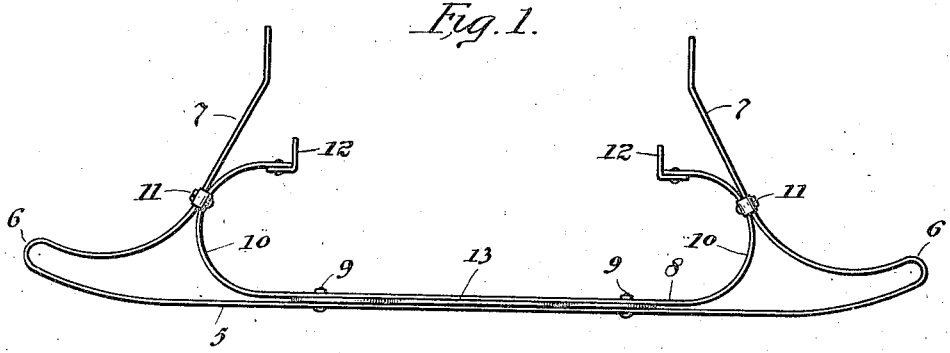
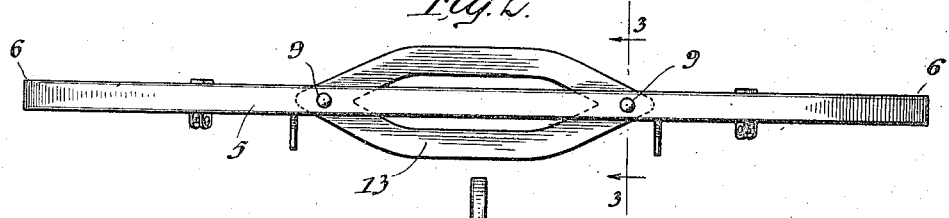
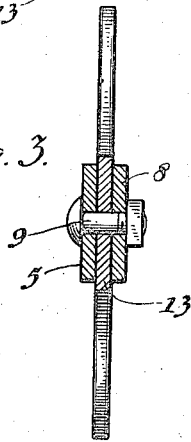
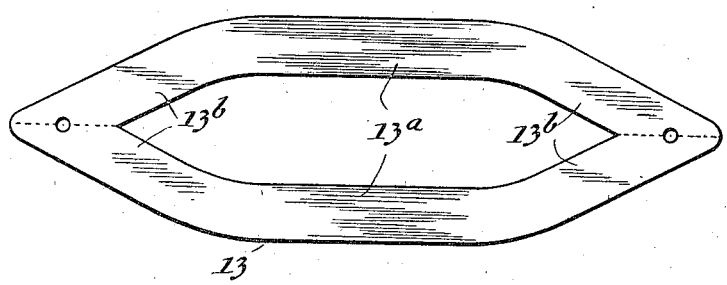
Inventor:
Lewis F. Stafford
By Benjamin, Roodhouse & Lundy
Attys.

Patented July 10, 1923.

1,461,564

UNITED STATES PATENT OFFICE.

LEWIS F. STAFFORD, OF CHICAGO, ILLINOIS, ASSIGNOR TO STAFFORD SPRING GUARD CO., OF CHICAGO, ILLINOIS, A CORPORATION OF ILLINOIS.

BUMPER.

Application filed November 21, 1921, Serial No. 516,729. Renewed May 29, 1923.

*To all whom it may concern:*

Be it known that I, LEWIS F. STAFFORD, a citizen of the United States, residing at Chicago, in the county of Cook and State of Illinois, have invented a new and useful Improvement in Bumpers, of which the following is a specification.

My present invention relates to bumpers for the front and rear ends of motors and like vehicles whereby a considerable proportion of the injuries usually resulting from collisions is avoided.

Motor vehicle bumpers are usually constructed from strips of strap spring metal of two to three inches in width and these straps in most types of bumpers extend across the width of the front or rear of the vehicle to about the planes of the outer edges of the wheel fenders or guards and the running-boards. On account of the extremely limited height of the bumpers (usually the width of a single strip of metal) the structures on two vehicles thus protected will frequently ride over each other in colliding and damage the vehicles in the manner which the bumpers are designed to avoid. The liability of this contingency arising is increased by the fact that there is no standardizing of the bumpers with respect to the distance, the same should be above the ground, thus permitting the bumpers on the divers vehicles to be positioned at any desired or convenient distance above the ground.

In the bumper I have disclosed herein, the central portion of the impact or shock-receiving member is of greater width than is ordinarily the case for the purpose of preventing a bumper of a colliding vehicle riding over the same. This widening of the impact member I accomplish by providing an elongated ring of the same strap or spring metal of which the other portion of the bumper is fabricated. Also, owing to the fact that this elongated ring is relatively short as compared to the "over-all" length of the impact-receiving member to which it is secured, I am enabled to fabricate the same of short lengths of the strap metal that would under ordinary conditions be discarded, or sold as junk.

Among the various objects of my invention are the provision of a bumper of the type hereinbefore described that is effective in performing its functions; that is comparatively simple in construction and is economical to manufacture so that it may be retailed for a moderate price. I prefer to carry out my invention in substantially the manner hereinafter fully described, and as particularly pointed out in the claims, reference being now had to the accompanying drawings, in which:

Figure 1 is a top plan of a bumper structure showing my improvements applied thereto.

Figure 2 is a front elevation of the structure illustrated in Figure 1.

Figure 3 is a transverse vertical section taken on line 3—3, Figure 2, and drawn to an enlarged scale.

Figure 4 is a front or face view of my widened impact portion, the same being detached and drawn to twice the scale of Figures 1 and 2.

My present invention is especially applicable to a bumper structure such as disclosed in United States Letters Patent No. 1,348,329 issued to me under date of August third, 1920, for a bumper for vehicles, and, for the purpose of convenience in illustrating the same, I have herein shown my improvement as attached between the main impact receiving member and the supplementing supporting member.

In the structure illustrated, the main impact receiving member 5 is a strip of spring or strap metal of sufficient length to extend across the width of the vehicle either at its front or rear. At the ends of impact member 5 the metal is looped or given hair-pin bends 6, 6, and then extends inwardly and rearwardly to provide arms 7, 7, for attachment to a suitable and convenient portion of the vehicle. For the purpose of giving the structure additional support and relieving the long arms 7, 7, of some of the weight of the outer portion of the bumper a supplementary supporting structure is provided which comprises a suitable strip of strap or spring metal having a substantially straight portion 8 that lies back of and parallel with the impact receiving member 5, as seen in Figure 1. Suitable elements, such as bolts and nuts 9, or rivets, secure the parallel portion of the impact and supplementary members 5 and 8 together, and just beyond these securing elements 9 the supplementary member is curved outwardly in a rearward direction and then inwardly, all in what might be termed semi-circular bends 10, 10. The ends of the strip forming the supplementary member terminate in planes forward of the planes of the rear ends of arms 7 and the semi-circular bends 10 are so constructed that they approach or contact arms 7 to which they are connected by suitable clips 11. The ends of the supplementary member are either themselves constructed or are provided with devices to assist in securing the supplementary member to an adjacent portion of the vehicle at locations in front of the points at which the ends of arms 7 are secured to the vehicle.

Secured to the bumper structure by the elements 9, 9, that connect the impact member 5 to the supplementary member 8 is an elongated ring shaped member that provides an additional area or wider portion of impact receiving structure in the central portion of the bumper. This element preferably comprises two strips or short lengths of the strap or spring metal of which the bumper is fabricated, the central portions 13$^a$ of which strips are substantially straight and parallel with members 5 and 8 and spaced slightly above and below the same. The end portions 13$^b$ converge towards and meet each other in a plane intersecting the width of members 5 and 8, and the meeting edges of the two pieces forming this member are brazed, welded or otherwise suitably connected together to form an integral structure. In mounting the widened impact member in the bumper, I prefer to place the same between the impact member 5 and outer or parallel portion 8 of the supplementary supporting member, and in this manner I am enabled to secure the ring member 13 to the bumper structure by the same elements 9, 9, that connect the members 5 and 8 together, thereby forming a very rigid connection, and the fact that ring member 13 may be made of two relatively short lengths of the same metal of which the other portions of the bumper are made enables me to utilize material for this purpose that would ordinarily be wasted or discarded in the fabrication of the bumpers. Also the widened portion may be readily and economically replaced in the event of injury or damage being done to it in collision or accident.

What I claim as new is:

1. A bumper comprising an impact member, arms extended therefrom for attachment to a vehicle, a supplementary member having means for attachment to a vehicle and the central portion whereof extends parallel and adjacent the corresponding portion of the impact member, and an element of greater width than the impact member interposed between the latter and said supplementary supporting member and secured to said members.

2. A bumper comprising an impact member, means for mounting the same upon a vehicle, a supplementary member also connected to the vehicle and supporting the outer portion of said impact member, and an element of greater width than said impact member interposed between the same and said supplementary supporting member.

3. A bumper comprising an impact member and a supplementary supporting member therefor, portions of which members are disposed parallel and adjacent each other, and a supplementary impact member of greater width and less length than the first impact member and interposed between said impact member and the supplementary supporting member and secured thereto.

4. A bumper comprising an impact member, means for mounting the same upon a vehicle, supplementary arms connected to the vehicle and supporting the outer portion of the impact member, and an element of greater width than the impact member and connected thereto adjacent the points of attachment of said supplementary arms.

5. A bumper comprising an impact member, means for mounting the same upon a vehicle, supplementary arms connected to the vehicle and supporting the outer portion of the impact member, and an element of greater width than the impact member interposed between the latter and the outer portions of said supplementary arms.

6. A bumper comprising an impact member, integral arms extending from the ends thereof for attachment to a vehicle, supplementary arms connected to the vehicle and supporting the outer portions of the impact member, and an element of greater width than the impact member interposed between the latter and the outer portions of said supplementary arms and connected to said impact member adjacent the points of attachment of said supplementary arms.

Signed at Chicago, county of Cook and State of Illinois, this 7th day of Nov., 1921.

LEWIS F. STAFFORD.